United States Patent [19]

Kwak et al.

[11] Patent Number: 5,539,039
[45] Date of Patent: Jul. 23, 1996

[54] PROCESS FOR THE PREPARATION OF STABLE WATER BASED STOCK SOLUTIONS OF CROSSLINKED LOWER ALKYL VINYL ETHER AND MALEIC ANHYDRIDE COPOLYMERS AND HYDROGEL PRODUCT OF THE PROCESS

[75] Inventors: Yoon T. Kwak, Wayne; Stephen L. Kopolow, Plainsboro; Robert B. Login, Oakland, all of N.J.

[73] Assignee: ISP Investments Inc., Wilmington, Del.

[21] Appl. No.: 359,096

[22] Filed: Dec. 19, 1994

[51] Int. Cl.$^6$ ........................................................ C08K 3/10
[52] U.S. Cl. ........................... 524/401; 526/271; 526/272
[58] Field of Search ............................. 524/401; 526/271, 526/272

[56] References Cited

U.S. PATENT DOCUMENTS 5,178,143   1/1993   Kwak et al. .............................. 128/639

*Primary Examiner*—Jeffrey T. Smith
*Attorney, Agent, or Firm*—Marilyn J. Maue; Joshua J. Ward

[57] ABSTRACT

This invention relates to stable colorless concentrates and stock solutions of 1–5% crosslinked lower alkyl vinyl ether/maleic anhydride copolymers having a Brookfield viscosity of up to about 25,000 cps and to the process for their preparation.

11 Claims, No Drawings

PROCESS FOR THE PREPARATION OF STABLE WATER BASED STOCK SOLUTIONS OF CROSSLINKED LOWER ALKYL VINYL ETHER AND MALEIC ANHYDRIDE COPOLYMERS AND HYDROGEL PRODUCT OF THE PROCESS

DESCRIPTION OF THE PRIOR ART

Moderately crosslinked copolymers of lower alkyl vinyl ethers and maleic anhydride have long been recognized as water soluble thickeners for use in personal care, agricultural, medicinal and detergent compositions. To prevent the hydrolysis of the maleic anhydride monomer during polymerization, such polymers have been prepared in non-aqueous systems using organic solvents such as cyclohexane, ethyl acetate, toluene, xylene and the like, as shown in U.S. Pat Nos. 5,034,488; 5,223,580; 5,003,014 and 5,082,913. Stable water based concentrates or stock solutions, of such crosslinked polymers having reasonable shelf-life which retain clarity and thickening properties, while desirable, have not been heretofore obtainable. Therefore, it is an object of this invention to produce such a concentrate or aqueous stock solution of crosslinked lower alkyl vinyl ether/hydrolyzed maleic anhydride copolymers which are stable for an extended period without appreciable decrease in thickening properties or color degradation.

Another object of this invention is to produce a pumpable, translucent concentrate solution of said copolymer which is stable over a period of several years.

Still another object of the invention is to provide a process for the preparation of said stock solution which can be neutralized to a clear, colorless liquid.

These and other objects of the invention will become apparent from the following description and disclosure.

THE INVENTION

In accordance with this invention there is provided a moderately crosslinked alkyl vinyl ether/maleic anhydride (AVE/MA) copolymer concentrate in the form of a stable, aqueous 2.5–6 wt.% solids solution capable of being neutralized to a clear, colorless liquid having excellent thickening properties. The concentrate at least partially neutralized to a pH of about 3, can be employed directly as a hair fixative or, when neutralized to a higher pH, e.g. up to 11, can be incorporated into an existing cosmetic, agricultural, pharmaceutical, detergent or other commercial formulation to increase the viscosity thereof and to provide color and composition stability for extended shelf life of the formulation for several years. Another benefit derived from the present water based copolymeric solutions include their direct addition to commercial formulations without preliminary processing, such as heating the copolymer to liquification or presolubilizing/predispersing the copolymer in extraneous solvents or dispersants which may interact deleteriously with one or more components of the formulation. Further, addition of the present pumpable copolymer stock solution to existing mixtures provides formulations of improved uniform distribution of active components within a shortened period of time.

The present water based solutions of AVE/MA copolymer as a pumpable concentrate is prepared by observance of a certain critical acid concentration while contacting the copolymer with water and during hydrolysis of anhydride moieties to provide an aqueous 2.5–6 wt.%, preferably an aqueous 3–4 wt.%, solids solution. More specifically, a dry powder of from about 1 to about 5% crosslinked AVE/MA copolymer is introduced into deionized water containing a critically small amount of an inorganic acidic compound, selected from a group hereinafter named, to form an aqueous solution having a pH of from about 2 to about 3 and containing 0.005 to 2 wt. %, preferably from about 0.02 to about 1.00 wt. % acidic component based on copolymer. The resulting copolymer solution is subjected to agitation for a period of from about 0.5 to about 5 hours at a temperature of between 20° and 80° C. or until a uniform stock solution concentrate is formed. The resulting product is recovered as a translucent, colorless concentrate having a Brookfield viscosity of between about 3,000 and about 25,000 cps, more desirably between about 5,000 and about 15,000 cps. This aqueous copolymer concentrate undergoes no polymer precipitation or coloration over a period of 3–5 years or more at room temperature.

The crosslinked polymer powder of the present invention is a maleic anhydride copolymer with a $C_1$ to $C_4$ alkyl vinyl ether, preferably methyl or ethyl vinyl ether, which is from about 1 to about 5% crosslinked with a terminally unsaturated $C_6$ to $C_{18}$ diene such as 1,5-hexadiene; 1,7-octadiene; 1,9-decadiene; 1,11-dodecadiene and 1,15-hexadecadiene or divinyl benzene and the like. The mole ratio of lower alkyl vinyl ether to maleic anhydride in the copolymer is generally at about 50 moles ether to about 50 moles anhydride; although ether to anhydride ratios up to 60:40 are also useful. These copolymers generally have a number average molecular weight above 1,000,000. The preferred polymer powder of this invention is a substantially pure methyl or ethyl vinyl ether/maleic anhydride (50:50) copolymer which is about 2 to about 4 % crosslinked with a $C_8$ to $C_{12}$ diene or a mixture thereof and have an average particle size of from about 1 to about 1,000 microns.

It is now discovered that the aqueous solution containing from 0.005 to 2 wt. % of the acidic component is mandated for retarding ionization of polymeric diacid during anhydride hydrolysis. The inorganic acid delays the polyelectrolyte effects in the system maintains a pH below 3.1 and thus retards undesirable ionization and avoids preliminary thickening associated with an anionic charge while allowing the formation of a pumpable liquid concentrate. In the present invention, the acidic component is an inorganic acid and/or a Lewis acid such as an inorganic alkali metal salt which is employed in the above defined critical concentration to form the aqueous copolymer solution concentrate. Above 2 wt. % acid concentration, the pH of the copolymer solution requires the addition of inefficiently large amounts of base for neutralization prior to formulation in a commercial product. The excessive amounts of salt formation resulting from such neutralization, causes significant lowering of viscosity which materially reduces the thickening properties of the concentrate. Conversely, at less than 0.005 wt. % acid concentration, the resulting liquid is an unpumpable viscous mass which is difficult to process and which fails to be uniformly distributed in a subsequent formulation.

Inorganic acids suitable for the present invention include both strong and weak acids, alone or in admixture. Examples of such acidic components include sulfuric acid, phosphoric acid, nitric acid, inorganic halides or sulfates, preferably sulfuric acid or sulfates, such as Group IA and IIA metal sulfates of which the sulfates of calcium, sodium and/or potassium are most preferred. Group IA and IIA metal chlorides can be used to some benefit when the concentrate is employed for other than personal care or pharmaceutical use, e.g. in industrial cleaning compositions. The strong acid components, such as sulfuric and nitric acids, are preferably employed in amounts of from about 0.035 to about 0.1 wt. % based on crosslinked polymer; whereas the metal halides, sulfates and weak acids such as phosphoric, and boric are preferably employed in concentrations of from about 0.5 to about 1.2 wt. % based on crosslinked polymer.

Agitation of the aqueous polymer dispersion, which may be accomplished for example with a mechanical stirrer, vibrator or other conventional means, can be carried out at room temperature and generally requires a residence time of from about 3 to about 5 hours; however, the concentrate can be formed more rapidly, e.g. within about 0.5 to about 1.5 hours, when mixing is preformed at a moderately elevated temperature such as from about 55° to about 80° C.

The colorless 2.5 to 6% solids concentrate is directly recovered as a product having a Brookfield viscosity of from about 3,000 to about 25,000 cps at 25° C., RV #7 spindle, 20 rpm and an extended stable shelf-life of at least 3 years.

The concentrate is strongly acidic having a pH of between about 2 and 3. This solution can be neutralized with any organic or inorganic base to a pH up to 11 or higher without loss of thickening properties or solution stability.

The acidic aqueous solution into which the crosslinked polymer is introduced may optionally contain up to 0.5 wt. % based on total composition of other additives, such as for example a preservative, an antioxidant, an antioxidant booster, chelating agent, a stabilizer and mixtures thereof or other excipients commonly employed in hydrogel compositions. By way of illustration, a particularly preferred aqueous solution for treatment of the crosslinked polymer powder contains the following composition:

0.08 acidic component, e.g. $H_2SO_4$ 0.1 sodium benzoate 0.03 benzophenone-4

0.03 disodium ethylenediaminetetraacetic acid (EDTA)

0.01 vitamin E

In the above formulation, other preservatives can be substituted or mixed with sodium benzoate. These include methyl chloro isothiazolinone, methyl isothiazolinone, methyl paraben, propyl paraben and diazolidinyl urea. Similarly, other antioxidants can be substituted or admixed with the above antioxidant system of benzophenone, disodium EDTA and vitamin E. Such antioxidants or antioxidant boosters include butylated hydroxy toluene, butylated hydroxy anilin, calcium disodium EDTA, t-butyl hydroxy quinone, etc.

The concentrate products of the present invention can be optionally diluted to any desirable polymer concentration in a formulation without loosing transparency or stability. These concentrates which are directly obtained by the above process can be conveniently stored for extended periods without fear of deterioration. The present concentrate can be used as is for hair spray having good holding power. Alternatively, it can be added to a pre-existing formulation to prove a stable product containing between about 0.15 and about 4% of the concentrate.

Having generally described the invention, reference is now had to the accompanying examples which illustrate preferred embodiments but which are not to be construed as limiting to the scope of the invention as described above and in the appended claims.

EXAMPLES 1–22

Compositions of 1,9-decadiene 3% crosslinked methyl vinyl ether/maleic anhydride were introduced into the aqueous solutions of deionized water reported in Table I and agitated for 1 hour at 75° C. under the indicated conditions to produce the described liquid concentrate products which are rated on a scale of 1 to 5, i.e.

1=unstable, 2=hazy, 3=translucent, stable 2 days, 4=translucent, stable for 1 month at 50° C. and 5=translucent, colorless, stable for more than 3 months at 50° C.

The above concentrate products became clear transparent liquids upon neutralization of the concentrate with a base, e.g. NaOH, to a pH of 3.5 or more.

TABLE I

| | | | grams of Additive(s) | | | |
|---|---|---|---|---|---|---|
| Ex. | Grams (g) X-linked MVE/MA | g. $H_2O$ | Stabilizer(s) | Antioxidant(s) | Preservative | Rating |
| 1 | 7.08 | 200 | 0.1 $CaSO_4$ | — | — | 3 |
| 2 | 3.73 | 96.11 | 0.09 $H_2SO_4$ | 0.01 Vit. E | — | 5 |
| 3 | 3.73 | 96.11 | 0.03 benzo-phenone-4 | 0.01 Vit. E | — | 1 |
| 4 | 3.73 | 96.11 | 0.03 diNa EDTA | 0.01 Vit. E | — | 3 |
| 5 | 9.33 | 240.14 | 0.11 $H_2SO_4$ | 0.01 Vit. E | 0.25 $C_6H_5COONa$ | 5 |
| 6 | 9.33 | 240.14 | 0.075 benzo-phenone-4 | 0.01 Vit. E | 0.25 $C_6H_5COONa$ | 1 |
| 7 | 9.33 | 240.14 | 0.075 diNa EDTA | 0.01 Vit. E | 0.25 $C_6H_5COONa$ | 3 |
| 8 | 7.80 | 200 | 0.10 Ca diNa EDTA | — | — | 2 |
| 9 | 7.80 | 200 | 0.10 calcium o-phosphate | — | — | 4 |
| 10 | 7.80 | 200 | 0.1 $K_2SO_4$ | — | — | 4 |
| 11 | 7.80 | 200 | 0.1 Kathon CG* | — | — | 2 |
| 12 | 7.80 | 200 | 0.2 Kathon CG | — | — | 2 |
| 13 | 7.80 | 200 | 0.1 CaCl | — | — | 4 |
| 14 | 7.80 | 200 | 0.1 CaCl | — | — | 4 |
| 15 | 7.80 | 200 | 0.15 CaCl | — | — | 4 |
| 16 | 7.80 | 200 | 0.2 CaCl | — | — | 4 |
| 17 | 7.80 | 200 | 0.4 CaCl | — | — | 4 |
| 18 | 27.55 | 710 | 0.64 $H_2SO_4$ | — | — | 5 |
| 19 | 31.48 | 710 | 0.64 $H_2SO_4$ | — | — | 5 |

TABLE I-continued

| Ex. | Grams (g) X-linked MVE/MA | g. $H_2O$ | Stabilizer(s) | Antioxidant(s) | Preservative | Rating |
|---|---|---|---|---|---|---|
| 20 | 11.2 | 287.2 | 0.21 benzophenone-4 | 0.105 BHT** | — | 3 |
| 21 | 11.2 | 287.2 | 0.21 diNa EDTA | 0.105 BHT | — | 3 |
| 22 | 11.2 | 287.2 | 1.1 $H_3PO_4$ | 0.105 BHT | — | 5 |

*0.35 Wt. % methylisothiazolinone + 1.15 Wt. % Chloromethylisothiazolinone + 23 Wt. % Mg salt + $H_2O$ qs
**butylated hydroxy toluene

What is claimed is:

1. A stable thickener concentrate comprising an aqueous solution containing from about 2.5 to about 6 wt. % of a crosslinked lower alkyl vinyl ether/maleic anhydride copolymer, 50:50–60:40 molar ratio and 0.005 to 2 wt. % based on copolymer of an inorganic compound selected from the group of consisting of an acid, an alkali metal halide, an alkali metal sulfate and mixtures thereof, said concentrate having a Brookfield viscosity of from about 3,000 to about 25,000 cps.

2. The concentrate of claim 1 wherein said copolymer is between about 1 and about 5% crosslinked.

3. The concentrate of claim 2 wherein said copolymer is crosslinked with a $C_6$ to $C_{18}$ diene.

4. The concentrate of claim i having a pH of 2–3.

5. The aqueous stable concentrate of claim 1 wherein said inorganic compound is an inorganic strong acid employed in a concentration of 0.035 to 0.1 wt. %.

6. The aqueous stable concentrate of claim 1 wherein said inorganic compound is a weak acid or an alkali metal chloride employed in a concentration of 0.5 to 1.2 wt. %.

7. The aqueous stable concentrate of claim 1 which contains up to 0.5 wt. %, based on total composition of an additive selected from the group consisting of a preservative, an antioxidant, a stabilizer, a neutralizer and mixtures thereof.

8. The concentrate of claim 1 wherein the aqueous solution contains 3 to 4 wt. % copolymer solids.

9. The concentrate of claim 1 having a Brookfield viscosity of from about 5,000 to about 15,000 cps.

10. The aqueous stable concentrate of claim 1 containing about 4 wt. % crosslinked copolymer, 0.04 wt. % sulfuric acid, 0.1 wt. % sodium benzoate, 0.03 wt. % benzophenone, 0.03 wt. % disodium EDTA and 0.01 wt. % vitamin E.

11. The concentrate of claim 1 which is neutralized to a pH of 3.5–11.

* * * * *